United States Patent
Motomura et al.

(10) Patent No.: US 6,724,446 B2
(45) Date of Patent: Apr. 20, 2004

(54) ILLUMINATION DEVICE AND/OR A LIQUID CRYSTAL DISPLAY DEVICE

(75) Inventors: Hironori Motomura, Ibaraki (JP); Naoki Takahashi, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/067,997

(22) Filed: Feb. 8, 2002

(65) Prior Publication Data

US 2002/0176164 A1 Nov. 28, 2002

(30) Foreign Application Priority Data

Apr. 3, 2001 (JP) .................................. P2001-103999

(51) Int. Cl.⁷ .................. G02F 1/1335; G02B 5/30; F21V 7/04
(52) U.S. Cl. ................. 349/62; 349/65; 349/115; 359/487; 362/31
(58) Field of Search .................. 349/61, 62, 65, 349/113, 115; 362/31, 19; 359/487

(56) References Cited

U.S. PATENT DOCUMENTS

| 6,016,177 A | * | 1/2000 | Motomura et al. | ........... 349/98 |
| 6,088,079 A | * | 7/2000 | Kameyama et al. | ........ 349/185 |
| 6,163,351 A | * | 12/2000 | Nakayama | .................... 349/61 |
| 6,246,455 B1 | * | 6/2001 | Iijima et al. | ................... 349/65 |

FOREIGN PATENT DOCUMENTS

| JP | 4-268505 | | 9/1992 |
| JP | 9-506984 | | 7/1997 |
| JP | 9-507308 | | 7/1997 |
| JP | 2001-067920 A | * | 3/2001 |
| JP | 2001-228310 A | * | 8/2001 |
| JP | 2001-311826 A | * | 11/2001 |
| WO | WO 95/17691 | | 6/1995 |
| WO | WO 95/17699 | | 6/1995 |

* cited by examiner

Primary Examiner—Tarifur R. Chowdhury
(74) Attorney, Agent, or Firm—Westerman, Hattori, Daniels & Adrian LLP

(57) ABSTRACT

There is provided an illuminator having a planar light source unit having reflectance of from 50 to 90% with respect to light in a state in which the light is emitted from a light source provided separately from the planar light source and incident on the planar light source unit, and a reflective type polarizer disposed on a light exit side of the planar light source unit so that a reflected light component and a transmitted light component of polarized light can be obtained from natural light incident on the reflective type polarizer. There is provided a liquid-crystal display device having an illuminator defined above, and a liquid-crystal display panel disposed on an upper side of the reflective type polarizer in the illuminator.

10 Claims, 1 Drawing Sheet

ILLUMINATION DEVICE AND/OR A LIQUID CRYSTAL DISPLAY DEVICE

The present application is based on Japanese Patent Application No. 2001-103999, which is incorporated herein by reference.

BACKGROUND OF THE INVENTION

1. Field of the Invention

The present invention relates to an illuminator which can supply polarized light suitable for improvement in luminance of a liquid-crystal display device.

2. Description of the Related Art

As an illuminator for improving luminance of a liquid-crystal display device, there has been heretofore known an illuminator having a reflective type polarizer which is disposed on a planar light source including a side light type light pipe or a direct type light pipe so that a reflected light component and a transmitted light component of polarized light can be obtained from natural light incident on the reflective type polarizer (Unexamined Japanese Patent Publication No. Hei. 4-268505). Such an illuminator is used as a backlight in a liquid-crystal display device so that polarized light can be supplied to the liquid-crystal display device to reduce absorption loss due to a polarizer. The illuminator is generally provided with a reflection plate so that the reflected light component separated by the reflective type polarizer can be utilized effectively.

In the case where the reflected light component separated by the reflective type polarizer is utilized effectively as described above, there is theoretical expectation that luminance as twice as that in the case where the reflective type polarizer is not used can be obtained. The related-art illuminator using the reflective type polarizer, however, has a problem that luminance can be improved to be no more than about 1.4 times.

SUMMARY OF THE INVENTION

An object of the invention is to develop an illuminator using a reflective type polarizer by which polarized light can be supplied to improve luminance to be not lower than 1.5 times, especially not lower than 1.6 times as high as that in the case where the reflective type polarizer is not used.

The invention provides an illuminator which has a planar light source unit having reflectance of from 50 to 90% with respect to light in a state in which the light is emitted from a light source provided separately from the planar light source and incident on the planar light source unit, and a reflective type polarizer disposed on a light exit side of the planar light source unit so that a reflected light component and a transmitted light component of polarized light can be obtained from natural light incident on the reflective type polarizer. The invention further provides a liquid-crystal display device which has an illuminator defined above, and a liquid-crystal display panel disposed on an upper side of the reflective type polarizer in the illuminator.

According to the invention, an illuminator using a reflective type polarizer can be obtained so that luminance can be improved to be not smaller than 1.5 times, especially, not smaller than 1.6 times as large as that in the case where the reflective type polarizer is not used. The illuminator can be used as a backlight for forming a liquid-crystal display device which is supplied with polarized light, bright and excellent in display quality. The improvement in luminance is based on controlling the light reflectance of the planar light source unit to the predetermined value. In the planar light source unit which is designed to utilize light from a light source as effectively as possible to make the whole surface evenly bright as represented by a related-art backlight system, it is difficult to improve return light-utilizing efficiency by use of the reflected light component when the planar light source unit is used together with a reflective type polarizer.

DETAILED DESCRIPTION OF THE PREFERRED EMBODIMENTS

Figure 1:
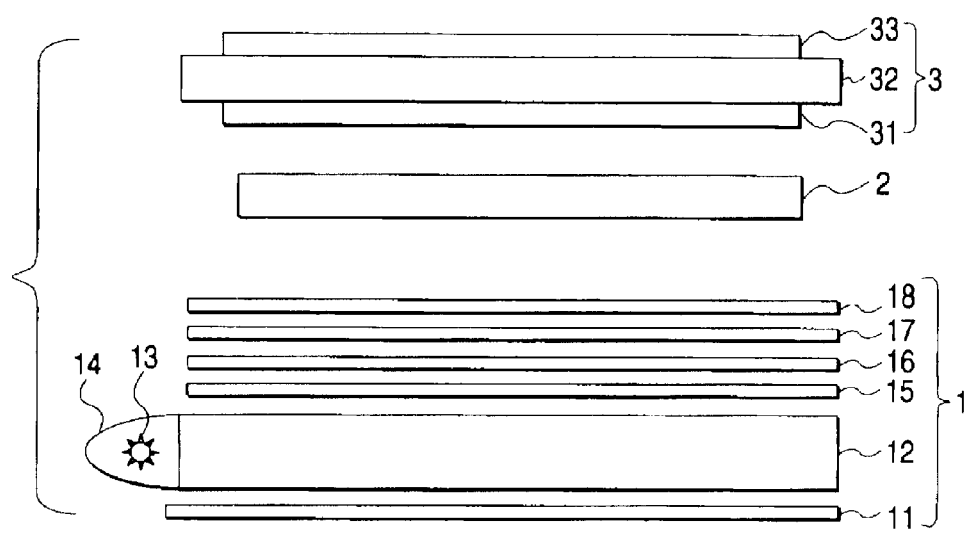
FIG. 1 is a side view for explaining an example of a liquid-crystal display device (illuminator)

An illuminator according to the invention includes a planar light source unit having reflectance of 50 to 90% with respect to light in a state in which the light is emitted from a light source provided separately from the planar light source and incident on the planar light source unit, and a reflective type polarizer disposed on a light exit side of the planar light source unit so that a reflected light component and a transmitted light component of polarized light can be obtained from natural light incident on the reflective type polarizer. FIG. 1 shows an example of the illuminator. The illuminator has at least a planar light source unit 1, and a reflective type polarizer 2. Incidentally, FIG. 1 shows, as a whole, a liquid-crystal display device provided with a liquid-crystal panel 3.

As the planar light source unit, there is used a suitable one by which reflectance with respect to light is controlled to be in a range of from 50 to 90% in a state that the light is emitted from a light source provided separately from the planar light source and incident on the planar light source unit. Such reflectance can be measured under a condition d in a method of measuring a reflective substance in according to JIS-Z-7822(4.3.1) in a non-emission state in which the planar light source is turned off. For example, a measuring device such as a color tester (SC-3 made by Suga Test Instruments Co., Ltd.) is available on the market.

If the reflectance is lower than 50%, the luminance improving effect of the reflective type polarizer cannot be fulfilled sufficiently because of the poor efficiency of utilizing the reflected light component separated by the reflective type polarizer. If the reflectance is higher than 90%, luminance becomes low or uniformity of brightness all over the whole surface becomes low because of poor light output efficiency in a state in which the reflective type polarizer is not used. From the point of view of re-utilizing a reflected light component of polarized light separated by the reflective type polarizer in a viewing direction without generating any absorption loss as much as possible to thereby obtain the luminance-improving effect of the reflective type polarizer more effectively, the preferred reflectance of the planar light source unit is not lower than 60%, especially not lower than 70%.

As the planar light source unit, it is possible to use a suitable one in accordance with a backlight such as a side light type light pipe or a direct type light pipe used in a liquid-crystal display device. Any planar light source unit may be used if all members constituting the planar light source unit and located under the reflective type polarizer can satisfy the required reflectance as a whole. Hence, the planar light source unit may be constituted by a combination of a plurality of members.

Figure 2:
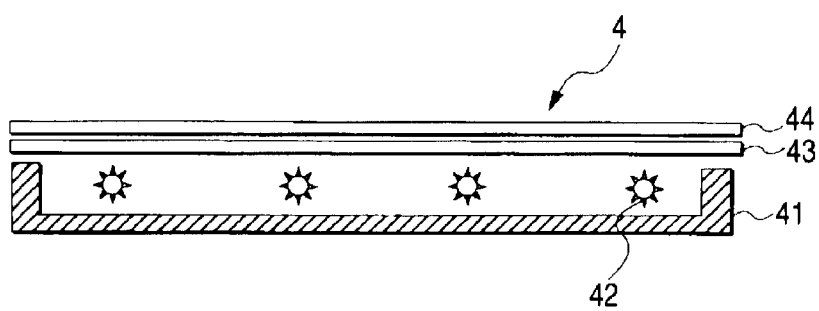
FIG. 2 is a side view for explaining another example of the planar light source unit.

Incidentally, the planar light source unit 1 shown in FIG. 1 includes a light pipe 12, light-diffusing plates 15 and 18 and light-condensing sheets 16 and 17, and a reflection plate 11. The light pipe 12 is formed as a side light type light pipe and provided with at least one light source 13 which is disposed on at least one of side surfaces of the light pipe 12 and which is enclosed and fixed by a reflector 14. The light-diffusing plates 15 and 18 and light-condensing sheets 16 and 17 are provided on a light exit side of the light pipe 12, while the reflection plate 11 is provided on aside (opposite to the light exit side) of the light pipe. On the other hand, a direct type planar light source unit represented by an example shown in FIG. 2 includes a reflection plate 41, at least one light source 42 disposed above the reflection plate 41, and light-diffusing plates 43 and 44 disposed above the light source 42.

In the description, the light pipe may be provided with light output means constituted by dots or prismatic structures so that light incident on a side surface of the light pipe can be made to exit from one of upper and lower surfaces of the light pipe. As the light source, it is possible to use a suitable one such as a cathode tube, an electric bulb, an electroluminescent lamp, a light-emitting diode or a linear light source body using such a light-emitting diode. The reflection plate is necessary from the point of view of utilizing the reflected light component separated by the reflective type polarizer. As the reflection plate, it is possible to use a suitable one in accordance with the related art such as a reflection sheet or a sheet of metal foil.

On the other hand, one light-diffusing layer or two or more light-diffusing layers can be used as occasion demands in order to make brightness of a light-emitting surface uniform. As the light-diffusing plate, it is possible to use a suitable one in accordance with the related art. One light-condensing sheet or two or more light-condensing sheets can be used as occasion demands in order to control the optical path of exit light. As the light-condensing sheet, it is possible to use a suitable one in accordance with the related art such as a lens sheet or a prism sheet. In the example shown in FIG. 1, two layers of prism sheets are disposed so that the ridgelines of prisms in the prism sheets cross one another perpendicularly, so that light diffused vertically or horizontally can be condensed into the frontal surface.

Hence, the reflectance of the planar light source unit can be adjusted by all members constituting the planar light source unit. A member which does not absorb light or a member which does not scatter light internally may be used advantageously in order to improve the reflectance of the planar light source unit. Particularly, a system of adjusting the reflectance through a light-diffusing plate or a light-condensing sheet used as occasion demands is preferred from the point of view of efficiency in production of the planar light source unit, production of the planar light source with facility, and so on. In this case, a plurality of light-diffusing plates might be heretofore used for improving uniformity of brightness all over the whole surface. As the number of light-diffusing plates used increases to thereby make the diffusing efficiency be increased, the reflectance of the planar light source unit decreases because of light absorption loss and internal scattering loss made by the light-diffusing plates themselves and, accordingly, the luminance-improving effect of the reflective type polarizer can be hardly fulfilled.

Hence, reduction in number of constituent members of the planar light source unit, especially reduction in number of light-diffusing plates or light-condensing sheets used is favorable for improvement of reflectance. Use of two or less layers of light-diffusing plates, especially use of one layer of a light-diffusing plate, further especially use of no light-diffusing plate is preferred. In this case, as a light-diffusing method for improving uniformity of brightness all over the whole surface, it is possible to preferably use a method in which a light-diffusing plate is disposed on a light exit side (light transmission side) of the reflective type polarizer or a method in which a light-diffusing function is given to the reflective type polarizer itself to diffuse light transmitted through the reflective type polarizer.

As described above, when there is used the method in which light emitted from the planar light source unit without being diffused as much as possible is supplied to the reflective type polarizer, and then the light transmitted through the reflective type polarizer or the light after the transmission is diffused, surface light emission excellent in uniformity of brightness can be achieved while the state of polarization of the transmitted light through the reflective type polarizer can be kept good. In addition, light-utilizing efficiency by use of the reflective type polarizer can be enhanced even if the frontal luminance of the planar light source unit itself is reduced to be lower than that of a light-diffusing plate-including planar light source using the same light source because the planar light source unit in this case has no light-diffusing plate. As a result, luminance of the liquid-crystal display device can be enhanced.

As the reflective type polarizer 2 disposed on the light exit side of the planar light source unit 1 as shown in FIG. 1, it is possible to use a suitable one by which a reflected light component and a transmitted light component of polarized light can be obtained from natural light incident on the reflective type polarizer 2. Examples of the reflective type polarizer 2 include: a linearly polarized light separating sheet (Unexamined International Patent Publication No. Hei. 9-506984 and Unexamined International Patent Publication No. 9-507308) constituted by a multilayer laminate of at least two kinds of materials different in refractive index; and a circularly polarized light separating sheet constituted by cholesteric liquid-crystal layers. Incidentally, the reflective type polarizer given a light-diffusing function itself can be provided by a suitable method such as a method of impregnating the reflective type polarizer with transparent fine particles, or a method of providing fine unevenness in a surface of the reflective type polarizer by means of roughening a surface of the reflective type polarizer in a sandblasting manner or by means of attaching a transparent fine particle-containing coating film to a surface of the reflective type polarizer.

The linearly polarized light separating sheet is provided for separating incident light into a reflected light component and a transmitted light component of linearly polarized light having planes of vibration crossing each other perpendicularly. A sheet such as DBEF (made by 3M Company) is available on the market. On the other hand, the circularly polarized light separating sheet is constituted by cholesteric liquid-crystal layers aligned in the Grandjean texture. The circularly polarized light separating sheet is provided for separating incident light into a reflected light component and a transmitted light component of one of left- and right-handed circularly polarized light beams. Incidentally, because a transmitted light component of circularly polarized light is obtained by the circularly polarized light separating sheet, the reflective type polarizer may be constituted by a laminate of the circularly polarized light separating sheet and a quarter-wave plate for converting the circularly polarized light into linearly polarized light.

Any suitable material can be used as the cholesteric liquid-crystal layer without any particular limitation in kind, if the material exhibits characteristic such that the material reflects a light component constituted by one of left- and right-handed circularly polarized light rays out of the incident light while the material transmits the other light component of the incident light. The circularly polarized light separating sheet can be obtained as a film of a cholesteric liquid-crystal polymer or as a cholesteric liquid-crystal layer supported closely on a transparent base material. The circularly polarized light separating sheet may have a multilayer structure of two or three or more cholesteric liquid-crystal layers different in reflection wavelength range in order to obtain transmitted circularly polarized light in a wide wavelength range.

The reflective type polarizer is provided for using the polarized light separating function to separate a transmitted light component of polarized light out of the light which is emitted from a light source and which is incident on the planar light source unit so that the transmitted light component is supplied to an absorptive type polarizer with a result of reduction in absorption loss. A reflected light component separated by the reflective type polarizer is reversed by the reflection layer in the planar light source unit and made incident on the reflective type polarizer again. The reflected light component is partly or wholly transmitted as predetermined polarized light through an absorptive type polarizer. Thus, the reflective type polarizer is also provided for increasing the light quantity allowed to be used for liquid-crystal display to thereby improve luminance. The reflective type polarizer preferably used from the point of view of improvement in luminance is a plate having polarized light reflectance of not lower than 40%.

As the quarter-wave plate provided for the circularly polarized light separating sheet as occasion demands in order to convert the circularly polarized light into linearly polarized light, it is possible to use a suitable one in accordance with the related art such as a birefringent film made of a drawn film of any kind of polymer, an aligned film of a liquid-crystal polymer such as a discotic liquid-crystal polymer or a nematic liquid-crystal polymer, or an aligned liquid-crystal layer of the liquid-crystal polymer supported on a transparent base material. The birefringent film may be a film subjected to a suitable method such as a uniaxial method or a biaxial method. Alternatively, the birefringent film may have a thicknesswise gradient index profile controlled by a method of giving shrinking force or/and drawing force to the birefringent film under its adhesion to a heat-shrinkable film.

The quarter-wave plate may be constituted by a laminate of two or more retardation layers in order to control optical characteristic such as retardation. Incidentally, the quarter-wave plate functioning in a wide wavelength range such as a visible light range can be obtained by a method of superposing a first retardation layer on a second retardation layer, the first retardation layer functioning as a quarter-wave plate to monochromatic light such as light with a wavelength of 550 nm, the second retardation layer exhibiting another retardation characteristic, for example, a retardation layer functioning as a half-wave plate.

The illuminator according to the invention can be used for various kinds of purposes. Particularly, the illuminator can be preferably used as a backlight for a liquid-crystal display device because the illuminator provides polarized light. For example, the liquid-crystal display device can be formed by arrangement of the liquid-crystal display panel 3 on the upper side of the reflective type polarizer 2 in the illuminator as shown in FIG. 1. Incidentally, in the reflective type polarizer having a circularly polarized light separating sheet provided with a quarter-wave plate, the quarter-wave plate is disposed on the liquid-crystal display panel side.

According to the liquid-crystal display device shown in FIG. 1, light exiting from the light pipe 12 of the planar light source unit 1 is diffused by the light-diffusing plate 15. After the optical path of the light is controlled by the light-condensing sheets 16 and 17, the light is diffused by the light-diffusing plate 18 and then made incident on the reflective type polarizer 2. In the reflective type polarizer 2, the light is separated into a reflected light component and a transmitted light component. The transmitted light component (polarized light) passes through the absorptive type polarizer 31 in a low absorption loss state and is made incident on the liquid-crystal cell 32. Thus, display light is emitted through the visual side polarizer 33. On this occasion, the reflected light component separated by the reflective type polarizer 2 is reversed by the reflection layer 11 on the lower surface side of the light pipe and made incident on the reflective type polarizer again, so that the light is partly or wholly transmitted through the reflective type polarizer. Hence, in addition to the low absorption loss due to the polarizer 31, improvement in light-utilizing efficiency is attained by use of the reflected light component. Hence, luminance of the liquid-crystal display device can be improved.

As the liquid-crystal display panel, it is possible to use a panel having a suitable form in which one or each of absorptive type polarizers 31 and 33 is provided on at one or each of opposite surfaces of the liquid-crystal cell 32 as shown in FIG. 1 in accordance with necessity. Hence, there can be used a suitable type liquid-crystal display panel such as an active matrix drive type panel represented by a thin-film transistor type panel, a passive matrix drive type panel represented by a TN panel or an STN panel or a panel provided with a color filter. When a liquid-crystal display device is formed, one kind or two or more kinds of suitable optical layers such as a compensating phase retarder allowed to be used for forming the liquid-crystal display device may be disposed in a suitable position or positions.

As the polarizer, it is possible to use a suitable one. Examples of the suitable polarizer include: a polarizer obtained by drawing a hydrophilic polymer film such as a polyvinyl alcohol film, a partially formalized polyvinyl alcohol film or a partially saponified ethylene-vinyl acetate copolymer film while making the hydrophilic polymer film adsorb iodine and/or dichromatic dye; a polarizing film made of a polyene-oriented film such as a dehydrated polyvinyl alcohol film or a dehydrochlorinated polyvinyl chloride film; and the polarizing film having one transparent protective layer provided on one or each of opposite surfaces of the polarizing film. In addition, the compensating phase retarder is generally disposed so as to be located between the visual-side polarizer and the liquid-crystal cell and/or between the back-side polarizer and the liquid-crystal cell in order to compensate for the retardation based on the birefringence of the liquid-crystal cell to thereby attain improvement in display quality.

Respective constituent layers in each of the planar light source unit, the reflective type polarizer and the liquid-crystal display panel for forming the illuminator or the liquid-crystal display device may be simply piled up. It is, however, preferable that the respective constituent layers are laminated and integrated with one another through adhesive layers such as tacky layers in order to stabilize quality due to prevention of displacement in the optical axis and improve efficiency in assembling the liquid-crystal display device. It is, however, preferable from the point of view of improvement in function that the light-condensing sheets or the like are disposed while a gap is formed between the light-condensing sheets.

EXAMPLE 1

Four cold-cathode tubes were disposed on a white reflection plate. A diffusing plate made of a transparent acrylic plate having coating layers of a silica particle-containing acrylic resin disposed on opposite surfaces of the transparent acrylic plate was disposed on the four cold-cathode tubes to prepare a direct type planar light source unit. A reflective type polarizer was disposed on the planar light source unit to thereby obtain an illuminator with frontal luminance of 3,800 cd/m$^2$ and reflectance of 71%. Incidentally, the reflective type polarizer was obtained by laminating a quarter-wave plate (frontal retardation: 130 nm) made of a drawn film of polycarbonate, through a 25 μm-thick acrylic tackifier, on a cholesteric liquid-crystal layer which had reflectance of 48% and exhibited selective reflection characteristic to a wavelength range of from 400 to 700 nm. The choleteric liquid-crystal layer side of the reflective type polarizer was provided as a light source side.

COMPARATIVE EXAMPLE 1

An illuminator was obtained in the same manner as in Example 1 except that a planar light source unit included a diffusing plate provided on an acrylic plate having an embossed surface, instead of the diffusing plate made of a transparent acrylic plate having coating layers of a particle-containing acrylic resin disposed on the transparent acrylic plate. The planar light source unit exhibited frontal luminance of 4,000 cd/m$^2$ and reflectance of 44%.

REFERENCE EXAMPLE 1

The planar light source unit obtained in Example 1 was used as an illuminator directly without arrangement of any reflective type polarizer.

REFERENCE EXAMPLE 2

The planar light source unit obtained in Comparative Example 1 was used as an illuminator directly without arrangement of any reflective type polarizer.

Evaluation Test

A liquid-crystal display panel having polarizers disposed on opposite surfaces of a TN type liquid-crystal cell was disposed on a light exit side (reflective type polarizer side) of the illuminator obtained in each of Example 1, Comparative Example 1 and Reference Examples 1 and 2. Thus, a liquid-crystal display device was formed. The frontal luminance of the liquid-crystal display device was examined. Results of the examination were as shown in the following Table.

|  | Example 1 | Comparative Example 1 | Reference Example 1 | Reference Example 2 |
| --- | --- | --- | --- | --- |
| Frontal Luminance (cd/m) | 310 | 280 | 190 | 200 |

This invention should not be limited to the embodiments described above. Various modifications can be included in this invention within a range which can be easily realized by those skilled in the art without departing from the spirit of the scope of claim.

What is claimed is:

1. An illuminator comprising:

a planar light source unit;

a reflective type polarizer disposed on a light exit side of said planar light source unit so that a reflected light component and a transmitted light component of polarized light can be obtained from natural light incident on said reflective type polarizer, wherein the planar light source has a reflectance of from 50 to 90% with respect to light in a state in which the light is emitted from a light source provided separately from the planar light source and incident on said planar light source unit in a non-emission state in which said planar light source is turned off.

2. An illuminator according to claim 1, wherein the reflectance of said planar light source unit is selected to be not lower than 70% whereas the polarized light reflectance of said reflective type polarizer is selected to be not lower than 40%.

3. An illuminator according to claim 1, wherein said reflective type polarizer is a linearly polarized light separating sheet.

4. An illuminator according to claim 3, wherein the linearly polarized light separating sheet is made of a multilayer laminate of at least two kinds of materials different in refractive index.

5. An illuminator according to claim 1, wherein said reflective type polarizer is one of a reflective type polarizer having a light-diffusing layer on its light exit side and a reflective type polarizer diffusing transmitted light.

6. A liquid-crystal display device comprising an illuminator according to claim 1, and a liquid-crystal display panel disposed on an upper side of said reflective type polarizer in said illuminator.

7. An illuminator according to claim 1, wherein said reflective type polarizer is a circularly polarized light separating sheet.

8. An illuminator according to claim 7, wherein the circularly polarized light separating sheet is made of cholesteric liquid-crystal layers.

9. An illuminator according to claim 1, wherein luminance is improved by not less than 1.5 times as compared to when no reflective type polarizer is used.

10. An illuminator according to claim 1, wherein luminance is improved by not less than 1.6 times as compared to when no reflective type polarizer is used.

* * * * *